Sept. 1, 1953     J. S. ALESSIO     2,650,826
PORTABLE ATTACHMENT FOR DOG RACE TRACKS
Filed Nov. 18, 1949     2 Sheets-Sheet 1
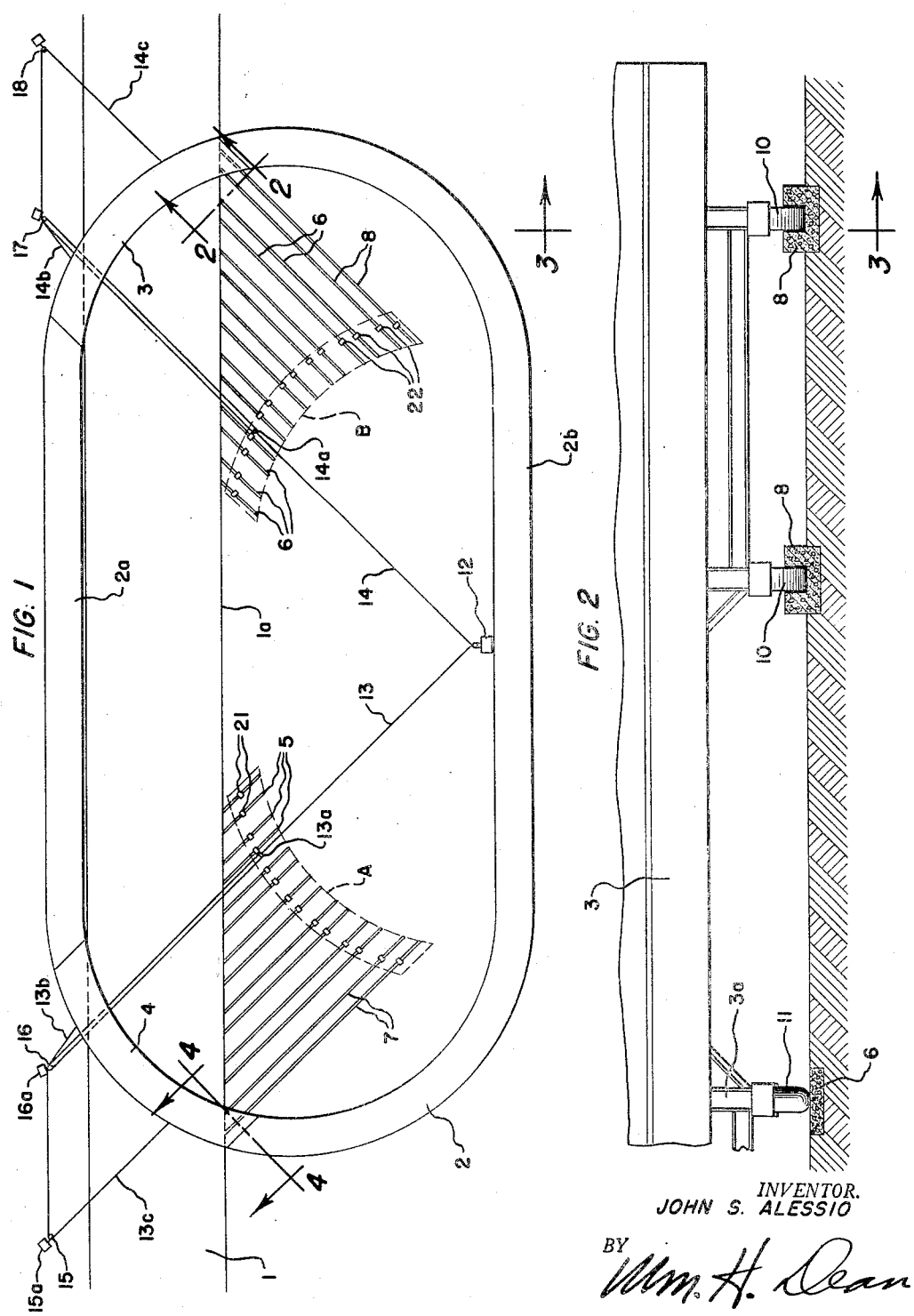
INVENTOR.
JOHN S. ALESSIO
BY
AGENT Sept. 1, 1953 J. S. ALESSIO 2,650,826
PORTABLE ATTACHMENT FOR DOG RACE TRACKS
Filed Nov. 18, 1949 2 Sheets-Sheet 2
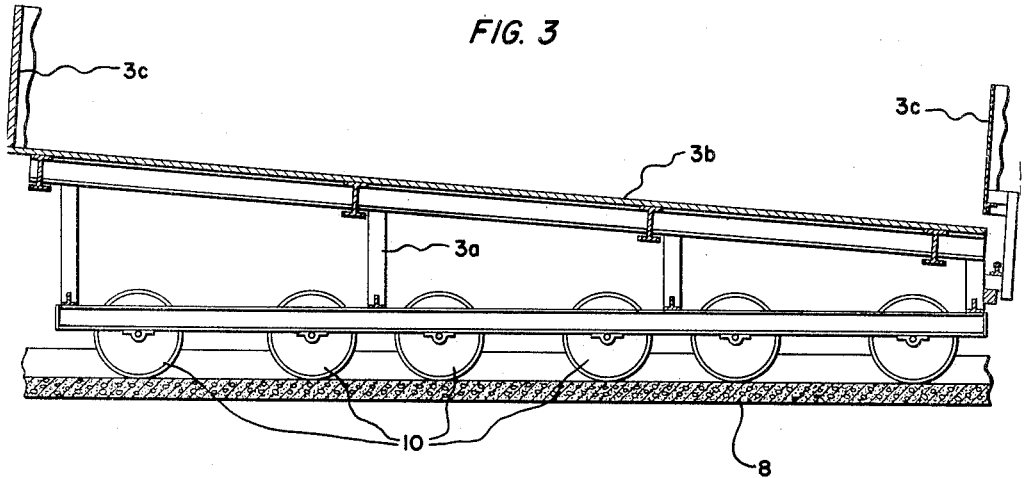
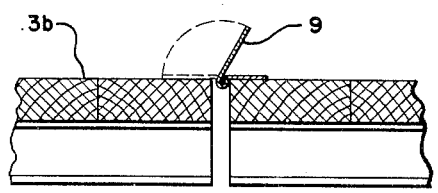
INVENTOR.
JOHN S. ALESSIO
BY
AGENT Patented Sept. 1, 1953

2,650,826

UNITED STATES PATENT OFFICE 2,650,826

PORTABLE ATTACHMENT FOR DOG RACE TRACKS

John S. Alessio, San Diego, Calif.

Application November 18, 1949, Serial No. 128,179

6 Claims. (Cl. 272—4)

My invention relates to a portable attachment for dog racing tracks, and the objects of my invention are:

First, to provide an attachment of this class which may be placed within the confines of a conventional horse racing track for readily converting and utilizing a portion of the horse racing track for a dog racing track;

Second, to provide an attachment for dog race tracks of this class which provides a movable section of track in an endless dog racing track which may be superimposed upon a conventional horse racing track, whereby the field and other facilities of the horse racing track may be utilized, so that the buildings and spectators' accommodations provided for the horse racing track may be employed when operating the dog race track;

Third, to provide an attachment for dog race tracks of this class in which precise guide means predetermine the exact location of the removable sections of the track relative to the stationary sections of the track, so that they exactly coincide when forced into place by motorized equipment;

Fourth, to provide an attachment for dog race tracks of this class which may be attached or removed from the remainder of the dog racing track in a minimum amount of time, and with very little effort;

Fifth, to provide an attachment for dog race tracks of this class wherein removable sections of the track are provided with novel means for joining the same, so that the joinder of the track does not interrupt the useful surface thereof;

Sixth, to provide a portable attachment for dog race tracks of this class having certain supporting wheels and guide wheels which provide for the mobility of the removable sections under various weather conditions, and over portions of other racing tracks;

Seventh, to provide a portable attachment for dog race tracks, which may be superimposed over conventional horse racing tracks, which is provided with guide means for guiding the rectilinear movement of the removable section, which guide means does not interrupt or interfere with the conventional horse racing track, yet which is in positive engagement with said removable section at all times; and Eighth, to provide a portable attachment for dog race tracks of this class which is very simple and economical of construction, in proportion to its utility, efficient, durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a top or plan view of my portable attachment for dog race tracks, shown superimposed over a conventional horse racing track and completing an endless dog track; Fig. 2 is an enlarged fragmentary sectional view, taken from the line 2—2 of Fig. 1; Fig. 3 is a fragmentary sectional view, taken from the line 3—3 of Fig. 2; and Fig. 4 is an enlarged fragmentary sectional view, taken from the line 4—4 of Fig. 1.

Similar characters of reference refer to similar parts and portions throughout the several views of the drawings.

The main race track 1, secondary race track 2, movable race track sections 3 and 4, foundation tracks 5 and 6, guide tracks 7 and 8, overlapping plates 9, guide wheels 10, supporting wheels 11, winch 12, cables 13 and 14, pulleys 15, 16, 17 and 18, and the service pits 21 and 22, constitute the principal parts and portions of my portable attachment for dog race tracks.

In the assembly of my portable attachment for dog race tracks, I employ a main race track 1, which may be a horse or vehicle racing track, adjacent to which conventional spectators' grandstands and buildings are positioned. The secondary race track 2 is a dog race track or the like, having movable race track sections 3 and 4, which are provided with similar structural elements. As shown in Fig. 3 of the drawings, the track section 3 is provided with a structural steel frame 3a, on the upper surface of which is positioned a track floor 3b, upon which the animals may run. The frame 3a is supported on guide wheels 10 and supporting wheels 11. The guide wheels 10, as shown in Figs. 2 and 3 of the drawings, traverse the guide tracks 7 and 8, below the movable track sections 3 and 4, respectively.

These guide tracks 8 are substantially U-shaped in cross-section, and serve to guide the guide wheels 10 in a rectilinear path for precise movement of the sections 3 and 4 into and out of register with the individual track portions 3a and 2b of the secondary race track 2. The guide wheels 10 are preferably steel wheels, and the guide tracks 8 are preferably made of reinforced concrete, but may be made of any suitable material, as desired. The foundation tracks 5 and 6, supporting the movable race track sections 3 and 4, respectively, are engaged by supporting wheels 11, which are rubber tired wheels, as shown in Fig. 2 of the drawings. These rubber tired wheels, operating on the foundation tracks 5 and 6, support the main portion of the weight of the movable race track sections 3 and 4. The foundation tracks 5 and 6, as shown in Fig. 2 of the drawings, are flat tracks, arranged to provide a hard smooth surface, on the upper side of which the rubber tired supporting wheels 11 may roll.

It will be noted that the movable race track sections 3 and 4 are arcuate, and that the guide tracks and foundation tracks hereinbefore described extend only to the edge 1a of the main race track 1, and it is to be noted that the extending ends of the guide tracks 7 and 8, adjacent to the edge 1a of the main race track 1, are engaged at all times by the guide rollers 10, inasmuch as the guide tracks 7 and 8 project into the arcuate path of the secondary track 2, outside the edge 1a of the main race track 1. It will be noted that the movable race track section 3, which is similar to the movable race track section 4, is provided with side rails 3c which extend above the upper surface 3b of the movable track section 3, all as shown best in Fig. 3 of the drawings.

The foundation and guide tracks 5 and 7 and 6 and 8 are provided with service pits 21 and 22, respectively, near the ends thereof to facilitate changing of tires and lubrication of wheel bearings of the guide wheels 10 and the supporting wheels 11. The cables 13 and 14 extend to connecting yokes 13a and 14a, which interconnect the cable portions 13b and 13c, and the cables 14b and 14c, respectively. It will be noted that these cables 13b and 13c pass through the common pulley 16, while the cable 13c passes through the individual pulley 15, and both of the pulleys 15 and 16 are anchored to stationary posts 15a and 16a, outside the main track 1. A similar arrangement of the cables 14b and 14c with respect to the pulleys 17 and 18 is made, which provides for the outward movement of the track 3 to the solid line position, as shown in Fig. 1 of the drawings. When it is desired to retract the track sections 3 and 4, the cables 14 and 13, respectively, are connected directly to the track sections 3 and 4 at their middle portions, and the winch 12 is used to directly retract the same to said dash line positions B and A, respectively.

It will be here noted that the movable track sections which cross the main track 1 are elevated and interconnect the secondary track portions 2a and 2b at opposite sides of the main track 1, which may be an oval endless track, adjacent to one straight side of which the secondary track 2 is installed.

The operation of my portable attachment for dog race tracks is substantially as follows:

When the movable sections 3 and 4 are in the solid line position, as shown in Fig. 1 of the drawings, a dog race may be conducted on the track 2, and when it is desired to operate a race on the track 1, the movable track sections 3 and 4 are retracted by means of the winch 12, as hereinbefore described, and the rollers 10, engaging the guide tracks 8, control rectilinear motion of the track sections 3 and 4, backwardly into the dash line positions B and A, respectively, maintaining the supporting wheels 11 on the track 6.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a race track assembly, a primary race track, an elevated secondary race track crossing said primary race track, said secondary race track having a removable track section, said removable track section constituting said crossing area, said track section comprising rectilinear guide means for horizontally guiding said track section into and out of register with remaining portion of said secondary race track, whereby said primary race track may be used by removing said track section.

2. In a dual race track, primary and secondary intersecting continuous race tracks, said secondary race track having track sections covering said primary race track at the intersecting areas, and said track sections being removable to uncover and to clear said primary race track.

3. In a dual race track, primary and secondary intersecting continuous race tracks, said secondary race track having track sections covering said primary race track at the intersecting areas, and said track sections being movable in a generally horizontal path to uncover and to clear said primary race track.

4. In a dual race track, primary and secondary intersecting continuous race tracks, said secondary race track having track sections covering said primary race track at the intersecting areas, said track sections being removable to uncover and to clear said primary race track, and rollers for supporting said track sections for movement in a generally horizontal path.

5. In a dual race track, primary and secondary intersecting continuous race tracks, said secondary race track having track sections covering said primary race track at the intersecting areas, said track sections being removable to uncover and to clear said primary race track, rollers for supporting said track sections for movement in a generally horizontal path, some of said rollers being guide rollers, channels for receiving and directing said guide rollers and said channels terminating at the outer edge of said primary track.

6. In a dual race track, primary and secondary intersecting continuous race tracks, said secondary race track having track sections covering said primary race track at the intersecting areas, said track sections being movable in a generally horizontal path out of register with said secondary track, rollers for supporting said track sections, some of said rollers constituting guide rollers, channels for receiving and for directing said guide rollers, said channels terminating at the outer edge of said primary track, a winch and cable means connected to said movable track sections for moving the same, whereby said primary track may be cleared by removal of said track sections.

JOHN S. ALESSIO.

References Cited in the file of this patent

UNITED STATES PATENTS

| Number | Name | Date |
|---|---|---|
| 559,031 | Hoopes | Apr. 28, 1896 |
| 920,346 | Kronenberger | May 4, 1909 |
| 1,433,547 | Hadden | Oct. 31, 1922 |
| 2,290,242 | Kasold | July 21, 1942 |

FOREIGN PATENTS

| Number | Country | Date |
|---|---|---|
| 595,091 | Great Britain | Nov. 26, 1947 |